Patented Apr. 2, 1940

2,195,785

UNITED STATES PATENT OFFICE 2,195,785

AMINO - PHENYLHYDRAZINESULPHONIC ACIDS AND PROCESS OF PREPARING SAME

Max Schmid, Riehen, Switzerland, assignor to the firm of Society of Chemical Industry in Basle, Basel, Switzerland No Drawing. Application April 1, 1937, Serial No. 134,452. In Switzerland April 9, 1936

6 Claims. (Cl. 260—510)

It is known that reduction products can be obtained from diazo compounds and sulphurous acid or the salts thereof, which products are hydrazine sulphonic acids.

The surprising observation has now been made that new compounds are obtained, viz. aminohydrazine-N-sulphonic acids or the salts thereof of the general formula $$NH_2-R-NH-N-SO_3H$$
$$|$$
$$H$$

in which R represents a radical constituted in such a manner that both the $NH_2$— group and the

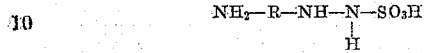

group are aromatically bound, if aromatic hydrazine sulphonic acids, which contain at least one aromatically bound nitro-group besides the hydrazine sulphonic acid group, are treated with such reducing agents which convert the nitrogroups into amino-groups, while avoiding the use of saponifying agents. The manufacture of such hydrazine sulphonic acids containing nitrogroups which may be used as starting materials for the present process has been described for example in German Patent No. 62,004, Berichte der Deutschen Chemischen Gesellschaft, vol. 25, III, page 119, and vol. 30, I, page 90. Radicals constituted in such a manner that both the $NH_2$— group and the

group are aromatically bound are, for example, aromatic radicals of the benzene series, the radicals of diphenyl, dibenzyl, stilbene, azimidobenzenes, and the like, which may carry substituents such as carboxylic acid or sulphonic acid groups.

The new compounds correspond therefore to the general formula $NH_2-R-NH-NH-SO_3H$ wherein R represents an aromatic radical which consists of at least one aromatic nucleus of the benzene series, and wherein both the $NH_2$— group and also the $NH-NH-SO_3H$— group are linked to a benzene radical, which products are light colored water-soluble powders which are converted into aminohydrazines when treated with saponifying agents. The new compounds are capable of the most varied reactions, since they may be subjected, if desired after splitting off the sulphonic acid radical, on the one hand to most of the characteristic hydrazine reactions and, on the other hand, to most of the reactions characteristic for the primary aromatic amino groups.

The folowing examples illustrate the invention, the parts being by weight:

Example 1

23.3 parts of meta-nitrophenylhydrazine-sulphonic acid of the formula

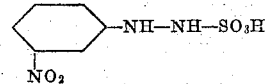

are dissolved in water in the form of its sodium salt. The solution is reduced in the usual manner with iron filings and acetic acid. The reducing liquor is made alkaline with sodium carbonate and filtered.

The solution which contains the sodium salt of the meta-aminophenylhydrazine sulphonic acid of the probable formula

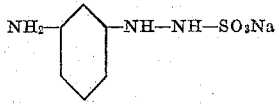

is evaporated to dryness in a vacuum.

By treating the new acid with acylating agents, for example by benzoylating, it can be converted into derivatives which may be easily separated.

Similar results are obtained with other nitrohydrazine sulphonic acids, for example with those which are derived from 1-methyl-2-amino-4-nitrobenzene, 1-methyl-2-amino- 5 -nitrobenzene, 1-amino-2-chloro-4-nitrobenzene and the like. In certain cases it is advantageous to isolate the aminohydrazine sulphonic acid only after the acylation, for example the benzoylation of the amino group.

Example 2

40 parts of 4:4'-aminonitrostilbene-2:2'-disulphonic acid are diazotized in the usual manner. The diazo compound is introduced into a cooled mixture of 63 parts of a sodium-bisulphite solution of about 40 per cent. strength, 15 parts of caustic soda solution of 36° Bé., and 3 grams of sodium carbonate. The whole is stirred until the diazo compound has disappeared and the solution is allowed to stand overnight, whereupon it is made weakly acid with hydrochloric acid.

The above solution is added in the course of about 2 hours to a boiling mixture of 60 parts of iron filings, 10 parts of hydrochloric acid $d=1.15$, and 300 parts of water. Boiling is continued for some time, whereupon the mixture is made alkaline with sodium carbonate and filtered hot.

The sodium salt of the 4-hydrazino-(ω-sulpho)-4'-amino-stilbene-2,2'-disulphonic acid of the probable formula

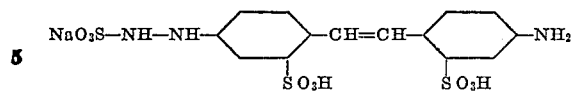

can be isolated from the mother liquor, if necessary after concentration.

The sodium salt of the new aminosulphonic acid represents a light yellow compound which is easily soluble in water.

*Example 3*

25.5 parts of n-(4'-phenyl)-ψ-azimido-4-aminobenzene of the formula

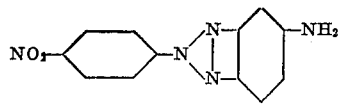

are diazotized in the usual manner. The diazo solution is introduced into a cold solution of 20 parts of sodium carbonate and 56 parts of bisulphite solution containing 39.5 per cent. of $NaHSO_3$. The whole is stirred until the diazo reaction has disappeared, then heated for a short time to about 80° C. and made weakly Congo acid. The solution which is still warm is filtered and salted out with common salt.

The light yellow hydrazine sulphonic acid which has precipitated is filtered and reduced in an aqueous solution with iron and acetic acid. After the reduction the solution is made alkaline with sodium carbonate and filtered from the iron mud. The solution of the reaction is neutralized and concentrated, and the sodium salt of the new aminohydrazine sulphonic acid of the probable formula

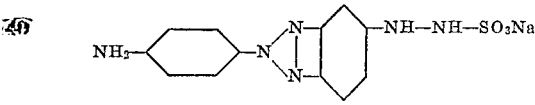

which precipitates is recrystallized from water, if necessary with addition of some animal charcoal. It forms a light yellow compound which is soluble in water and yields the hydrochloride of the hydrazine when treated with hydrochloric acid at a raised temperature.

What I claim is:

1. The compounds of the general formula $$NH_2-R-NH-NH-SO_3H$$

wherein R represents an aromatic radical which consists of at least one aromatic nucleus of the benzene series, and wherein both the $NH_2$— group and also the $NH-NH-SO_3H$— group are linked to a benzene radical, which products are light colored water-soluble powders which are converted into aminohydrazines when treated with saponifying agents.

2. The compound of the formula

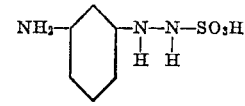

3. The compound of the formula

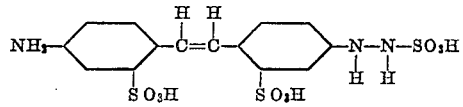

4. Process for the manufacture of aminohydrazine sulphonic acids, consisting in treating compounds of the general formula $$NO_2-R-NH-NH-SO_3H$$

wherein R represents an aromatic radical which consists of at least one aromatic nucleus of the benzene series, and wherein both the $NO_2$— group and also the $NH-NH-SO_3H$— group are linked to a benzene nucleus, with such reducing agents which convert the nitro-groups into amino-groups, while avoiding the use of saponifying agents.

5. Process for the manufacture of an aminohydrazine sulphonic acid, consisting in treating the compound of the formula

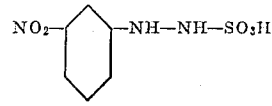

with such a reducing agent which converts the nitro-group into an amino-group, while avoiding the use of a saponifying agent.

6. Process for the manufacture of an aminohydrazine sulphonic acid, consisting in treating the compound of the formula

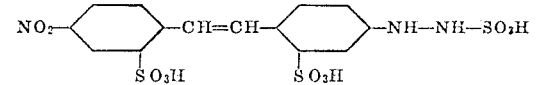

with such a reducing agent which converts the nitro-group into an amino-group, while avoiding the use of a saponifying agent.

MAX SCHMID.